United States Patent

[11] 3,564,338

[72] Inventors Toshihiko Teshirogi
Yokohama-shi, Japan;
Tsutomu Funamizu, Kawasaki-shi, Japan

[21] Appl. No. 749,179
[22] Filed July 31, 1968
[45] Patented Feb. 16, 1971
[73] Assignee Fujitsu Limited
Kawasaki, Japan
a corporation of Japan
[32] Priority Aug. 3, 1967
[33] Japan
[31] 42/49951

[54] OVERVOLTAGE AND OVERCURRENT PROTECTIVE CIRCUIT FOR A TRANSISTOR AMPLIFIER
7 Claims, 4 Drawing Figs.

[52] U.S. Cl. .............................................. 317/31, 317/33, 330/11
[51] Int. Cl. .............................................. H02h 3/26
[50] Field of Search .............................................. 317/16, 31, 33; 330/11P, 51; 307/202

[56] References Cited

UNITED STATES PATENTS

| | | | |
|---|---|---|---|
| 2,915,693 | 12/1959 | Harrison | 317/33X |
| 3,102,241 | 8/1963 | Johnstone | 330/11PX |
| 3,233,115 | 2/1966 | Chou | 330/51X |
| 3,240,997 | 3/1966 | Burgi | 317/31X |
| 3,449,598 | 1/1969 | Wright | 317/31 |

*Primary Examiner*—James D. Trammell
*Assistant Examiner*—Harvey Fendelman
*Attorneys*—Curt M. Avery, Arthur E. Wilfond, Herbert L. Lerner and Daniel J. Tick

ABSTRACT: A protective transistor connected in the input of a transistor amplifier is switched to its conductive condition when the difference between a voltage proportionate to the current flowing through the transistor amplifier and a voltage proportionate to the voltage applied to the transistor amplifier reaches a predetermined magnitude. When the protective transistor is switched to its conductive condition, it switches the transistor amplifier to its nonconductive condition.

OVERVOLTAGE AND OVERCURRENT PROTECTIVE CIRCUIT FOR A TRANSISTOR AMPLIFIER

DESCRIPTION OF THE INVENTION

The present invention relates to an overvoltage and overcurrent protective circuit for a transistor amplifier. More particularly, the invention relates to an overvoltage and overcurrent protective circuit for an audio frequency transistor amplifier.

On occasion, an overvoltage and/or an overcurrent may be applied to a transistor amplifier. Since the overcurrent and overvoltage exceed the rating of the transistor, such transistor is damaged due to the overvoltage or overcurrent. This results from short circuiting of the output load when the load is inductive or capacitive, or is due to the connection to the circuit of the power supply. Known transistor protective circuits use various methods to prevent damage to the transistors. In one protective circuit, a protective resistor is connected in series with the load. In another, fuses and relays are utilized to detect the current flowing through the transistor and to short circuit the input to the transistor thereby cutting off the source of supply voltage and the load. In these protective circuits, however, effective power is consumed and the utilization of fuses and relays produces distortion. Furthermore, there is a delay in the actual cutoff operation, so that it is impossible to protect the transistor from damage at the instant of instantaneous overload.

The damage to a transistor is determined by the electrical power which is the product of the current flowing through the transistor and the voltage applied to the transistor. Thus, in the ordinary condition of the circuit, an increase in current through the transistor will cause an increase in voltage drop across the load impedance, which will in turn cause a decrease in the voltage applied to the transistor. The electrical power consumed by the transistor is therefore not considerably increased, so that there are no adverse effects on the transistor. When the load is short circuited, however, the voltage drop across such load is negligible and almost the entire supply voltage is directly applied to the transistor. Consequently, an electrical power of a magnitude large enough to destroy the transistor is produced even when the current flowing through said transistor is not considerable. When the load is inductive or capacitive, the phase of the current flowing through the transistor and the phase of the voltage applied to the transistor are shifted, and, as in the case of short circuiting of the load, a relatively large voltage and current are provided so that an electrical power having a magnitude great enough to destroy the transistor is produced. For the foregoing reasons, known protective circuits and methods which utilize fuses, relays, or the like, and which provide protection by detecting only the current, do not provide complete protection for the transistor when large voltages are simultaneously applied to the transistor although the magnitude of the current may be inconsiderable. Such large voltages are applied when the load is short circuited or if such load is inductive or capacitive.

The principal object of the present invention is to provide a new and improved overvoltage and overcurrent protective circuit for a transistor amplifier.

An object of the present invention is to overcome the disadvantages of known protective circuits for a transistor amplifier.

An object of the present invention is to provide overvoltage and overcurrent protection for a transistor amplifier under any condition.

An object of the present invention is to provide an overvoltage and overcurrent protective circuit for a transistor amplifier, which protective circuit functions automatically and at high speed, with reliability, efficiency and effectiveness.

An object of the present invention is to provide overvoltage and overcurrent protection for a transistor amplifier when the load is short-circuited although the current flowing through the transistor is not considerable, and when a supply voltage of considerable magnitude is applied to the transistor so that the electrical power applied to the transistor is considerable.

An object of the present invention is to provide overvoltage and overcurrent protection for a transistor amplifier when the current flowing through the transistor and the voltage applied to the transistor are varied by a specific condition, so that such protection is provided even when the phase of the current and the phase of the voltage are shifted considerably.

An object of the present invention is to provide an overvoltage and overcurrent protective circuit for a transistor amplifier in which a protective transistor is directly connected to the transistor amplifier so that there is no cause for delay in operation and the protective operation is accomplished at high speeds in the order of milliseconds An object of the present invention is to provide an overvoltage and overcurrent protective circuit for a transistor amplifier wherein, if the base voltage of a protective transistor exceeds a predetermined magnitude, the transistor amplifier is instantaneously switched to its nonconductive condition, and if such base voltage is less than said predetermined magnitude, the transistor amplifier is instantaneously switched to its conductive condition, so that instantaneous overvoltage and overcurrent protection is provided when overvoltage and overcurrent pulses appear in the circuit.

In accordance with the present invention, an overvoltage and overcurrent protective circuit for a transistor amplifier having an input and an output comprises deriving means for deriving a first voltage proportionate to current flowing through the transistor amplifier and a second voltage proportionate to the voltage applied to the transistor amplifier. A protective transistor is connected to the input of the transistor amplifier and has an input and an output. Coupling means applies the first and second voltages to the input of the protective transistor in a manner whereby when the difference between the voltages reaches a predetermined magnitude said magnitude switches the protective transistor to its conductive condition to switch the transistor amplifier to its nonconductive condition. The deriving means determines the condition of operation of the transistor amplifier and short circuits the input of the transistor amplifier via the protective transistor.

A negative feedback circuit may be connected between the output and the input of the transistor amplifier. A source of supply voltage may be connected to the protective circuit via switching means and when the source of supply voltage is connected to the protective circuit, the protective transistor is switched to its conductive condition to switch the transistor amplifier to its nonconductive condition. A diode is connected in the output of the transistor amplifier for impeding an increase in voltage applied to the transistor amplifier upon a decrease in current flowing through the transistor amplifier in Class A operation.

The transistor amplifier has emitter, collector and base electrodes. The protective transistor has emitter, collector and base electrodes. A source of supply voltage has one terminal connected to the emitter electrode of the protective device and another terminal of opposite polarity connected to the collector of the transistor amplifier through a load. The collector electrode of the protective transistor is directly connected to the base electrode of the transistor amplifier. A first resistor is connected between the emitter electrode of the transistor amplifier and the one terminal of the source of supply voltage. A capacitor and a variable resistor are connected in series circuit arrangement between the collector electrode of the transistor amplifier and the one terminal of the source of supply voltage. The variable resistor has a slidable tap. A second resistor and a diode are connected in series circuit arrangement between the emitter electrode of the transistor amplifier and the slidable tap of the variable resistor. The base electrode of the protective transistor is connected to a common point in the connection between the second resistor and the diode.

In accordance with the present invention, a method of protecting a transistor amplifier from overvoltage and overcurrent with a protective transistor connected in the input of the transistor amplifier, comprises switching the transistor amplifier to its nonconductive condition by switching the protective transistor to its conductive condition when the difference between a voltage proportionate to current flowing through the transistor amplifier and a voltage proportionate to the voltage applied to the transistor amplifier reaches a predetermined magnitude.

When the transistor amplifier includes a negative feedback circuit, the negative feedback is terminated by operation of the protective circuit of the present invention and the transistor or transistors is or are switched to their nonconductive condition, although the cause of operation of the circuit may have been removed, and the protective circuit is kept in operation, if an input is provided to the amplifier and an excessively large input is provided thereto.

In order that the present invention may be readily carried into effect, it will now be described with reference to the accompanying drawings, wherein.

In the FIGS., the same components are identified by the same reference numerals.

Figure 1:
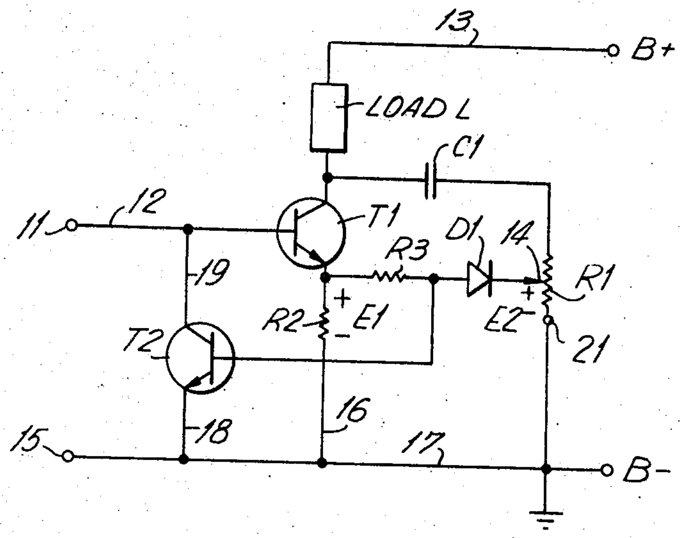
FIG. 1 is a circuit diagram of an embodiment of the overvoltage and overcurrent protective circuit of the present invention for a transistor amplifier.

In FIG. 1, a first input terminal 11 is connected to the base electrode of a transistor amplifier T1 via a lead 12. The collector electrode of the transistor amplifier T1 is connected to the positive polarity terminal B+of a source of supply voltage or electrical power via a lead 13 and a load L connected in said lead. The collector electrode of the transistor amplifier is also connected to the negative polarity terminal B− of the source of power supply via the series circuit connection of a capacitor C1 and a variable resistor R1. The variable resistor R1 has a slidable connector or tap 14.

The emitter electrode of the transistor amplifier T1 is connected in common to a second input terminal 15 and to the negative polarity terminal of the source of supply voltage via a lead 16, a lead 17 and a resistor R2 having a small resistance value, which resistor is connected in the lead 16. A protective transistor T2 has an emitter electrode connected in common to the input terminal 15 and the negative polarity terminal B− of the source of supply voltage via a lead 18 and the lead 17. The collector electrode of the protective transistor T2 is connected in common to the input terminal 11 and to the base electrode of the transistor amplifier T1 via a lead 19 and the lead 12.

A resistor R3 and a diode D1 are connected in series circuit arrangement between the emitter electrode of the transistor amplifier T1 and the slidable tap 14 of the variable resistor R1. The base electrode of the protective transistor T2 is directly connected to a common point in the connection between the resistor R3 and the diode D1. The resistor R2 functions to detect or determine the collector current of the transistor amplifier T1 and the variable resistor R1 functions to detect or determine the collector voltage of said transistor amplifier. The resistor R2 thus provides a voltage proportionate to the current flowing through the transistor amplifier and the resistor R1 provides a voltage proportionate to the voltage applied to said transistor amplifier.

Input signals are supplied to the transistor amplifier T1 via the input terminals 11 and 15. The input signals are amplified by the transistor T1 and are supplied to the load L. The variation of collector current $i_c$, which is the current flowing through the transistor amplifier T1, is indicated as the variation of the voltage drop E1 across the resistor R2. The variation of collector voltage $v_c$, which is the voltage applied to the transistor amplifier T1, is indicated as the voltage drop E2 between the slidable tap 14 of the resistor R1 and an end terminal 21 of said resistor. The variation of the collector current $i_c$ of the transistor amplifier T1 varies inversely with the variation of the collector voltage $v_c$ thereof. Thus, if the collector current $i_c$ is increased in magnitude, the collector voltage $v_c$ is decreased in magnitude due to the voltage drop across the load L.

Figure 2:
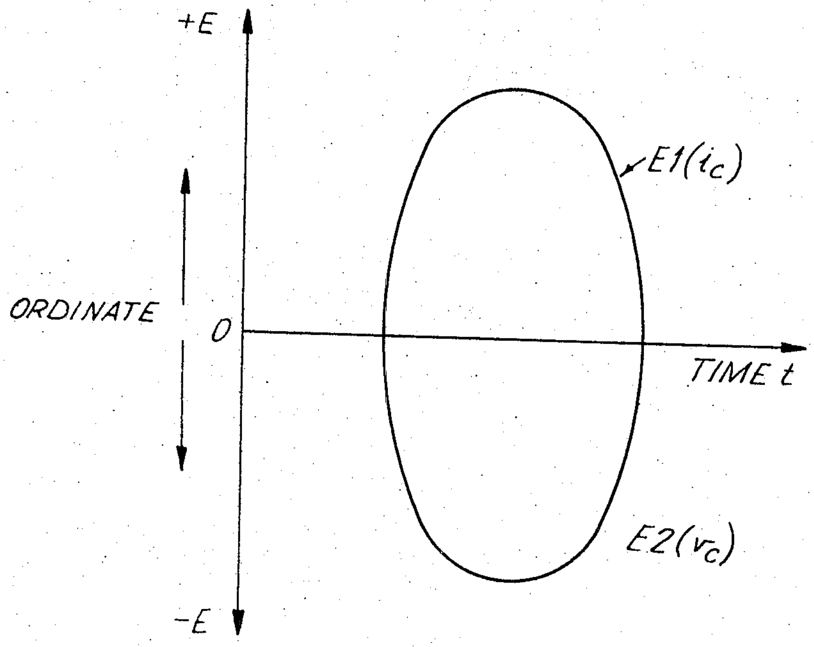
FIG. 2 is a graphical presentation for explaining the operation of the embodiment of FIG. 1.

By adjusting the voltage E1 to correspond to the collector current $i_c$, and by adjusting the voltage E2 to correspond to the collector voltage $v_c$, so that the absolute magnitudes of said voltages are equal to each other, as shown in FIG. 2, said voltages E1 and E2 may be balanced so that they cancel each other out and no voltage is produced at the base electrode of the protective transistor T2. This is illustrated in FIG. 2, wherein the abscissa represents the time $t$ and the ordinate represents the voltage E. The magnitudes of the first and second voltages E1 and E2 may be arbitrarily determined so that they cancel each other out, by adjustment of the variable resistor R1.

If an input of excessively large magnitude is applied to the input terminals 11 and 15, or if the load L is short circuited and the collector current $i_c$ of the transistor T1 is increased and its collector voltage $v_c$ is also increased, so that the balance of the first and second voltages E1 and E2 is upset, a positive voltage is applied to the base electrode of the protective transistor T2. When the magnitude of the voltage applied to the base of the protective transistor T2 reaches a predetermined level, which has been previously determined to trigger the operation of the protective circuit, said protective transistor is switched to its conductive condition. When the protective transistor T2 is in its conductive condition, it short circuits the input of the transistor amplifier T1 so that the base electrode of said transistor amplifier has a negative voltage applied thereto and said transistor amplifier is switched to its nonconductive condition thereby terminating operation as an amplifier and protecting said transistor amplifier from damage or destruction.

The diode D1 functions to derive only the voltage E2 in the negative direction necessary to cancel out the voltage E1. That is, when the magnitude of the voltage is increased, but the magnitude of the current is not increased, the positive voltage is increased but such increase is impeded, thus, no protection is required and the protective circuit is maintained inoperative. When the transistor amplifier T1 is in Class B or C operation, the protective transistor T2 may be in its conductive condition during the half period during which the transistor amplifier T1 is in its nonconductive condition, so that it is not absolutely necessary to provide the diode D1. The slidable tap 14 of the variable resistor R1 may therefore be directly connected to the base electrode of the protective transistor T2. Since the operation of the protective circuit depends upon the base voltage of the protective transistor T2, the point at which said protective circuit will operate may be arbitrarily adjusted by selection of said protective transistor.

Figure 3:
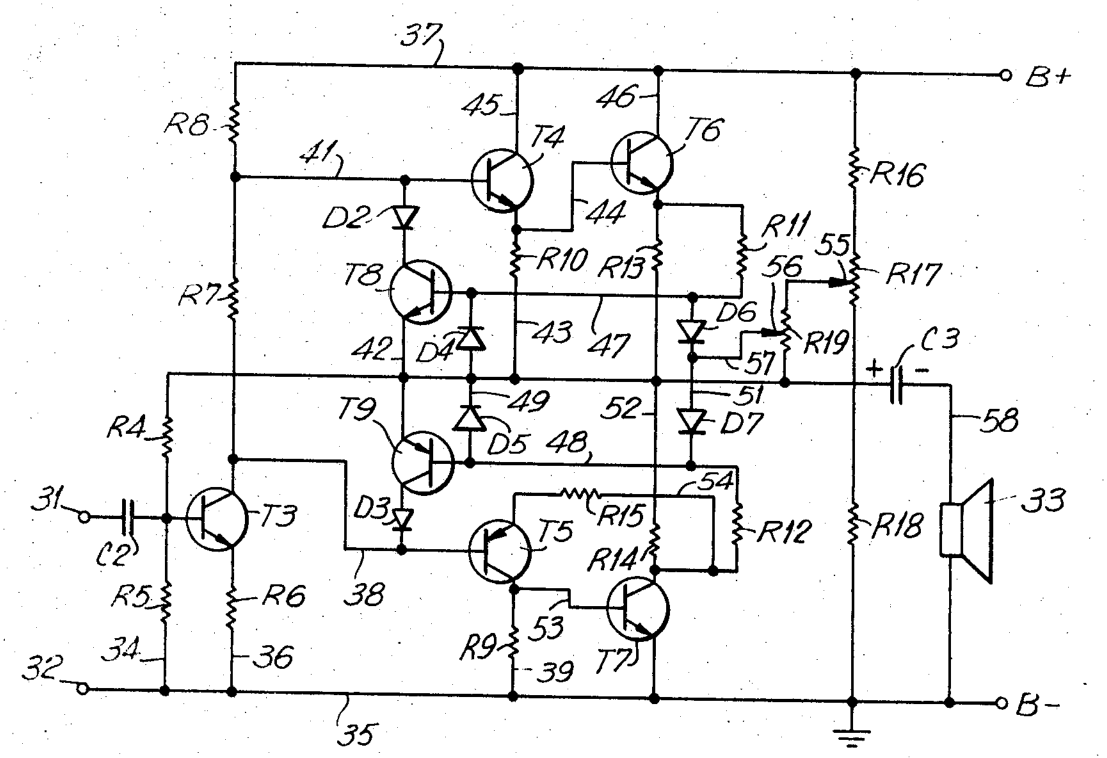
FIG. 3 is a circuit diagram of another embodiment of the overvoltage and overcurrent protective circuit of the present invention for a single ended push-pull transistor amplifier.

In the embodiment of FIG. 3, the transistor amplifier is a single ended push-pull amplifier. Input signals are supplied to the circuit via input terminals 31 and 32 and are amplified by a transistor preamplifier T3. The transistor T3 functions as a driver, and its output signals drive a transistor amplifier T4 and a phase inverting transistor amplifier T5. The output signals of the receivers T4 and T5 are supplied to push-pull output transistors T6 and T7, respectively, in the final amplifier stage, as balanced inputs and drive said transistors T6 and T7 to supply electrical output signals to a loudspeaker 33. In FIG. 3, the first input terminal 31 is coupled to the base electrode of the transistor T3 via a capacitor C2. The base electrode of the transistor T3 is also connected to one input terminal of the loudspeaker 33 via a resistor R4 and a capacitor C3 connected in series circuit arrangement between said base electrode and said terminal of said loudspeaker. The base electrode of the transistor T3 is further connected in common to the second input terminal 32 and to the negative polarity terminal B− of a source of supply voltage via a lead 34, a lead 35 and a resistor R5 connected in the lead 34. The lead 35 is connected to a point at ground potential.

The emitter electrode of the transistor T3 is connected to the ground lead 35 via a lead 36 and a resistor R6 is connected in the lead 36. The collector electrode of the transistor T3 is connected to the positive polarity terminal B+ of the source of supply voltage via a lead 37 and a pair of resistors R7 and R8 connected in series circuit arrangement in said lead. The collector electrode of the transistor T3 is also directly connected to the base electrode of the transistor T5 via a lead 38. The collector electrode of the transistor is connected to the ground lead 35 via a lead 39 and a resistor R9 connected in the lead 39. The base electrode of the transistor T4 is connected to a common point in the connection between the resistors R7 and R8 via a lead 41. The base electrode of the transistor T4 is also connected to the collector electrode of a first protective transistor T8 via a diode D2. A second protective transistor T9 has a collector electrode connected to the lead 38 via a diode D3.

The emitter electrode of the first protective transistor T8 is directly connected to the emitter electrode of the second protective transistor T9 via a lead 42 which is electrically connected to a common point in the connection between the resistor R4 and the capacitor C3. The emitter electrode of the transistor T4 is connected to a common point in the connection between the resistor R4 and the capacitor C3 via a lead 43 and a resistor R10 connected in said lead. The emitter electrode of the transistor T4 is also directly connected to the base electrode of the transistor T6 via a lead 44. The collector electrode of the transistor T4 is directly connected to a common point in the lead 37 between the resistor R8 and the positive polarity terminal B+ via a lead 45. The collector electrode of the transistor T6 is directly connected to a common point in the lead 37 between the resistor R8 and the positive polarity terminal B+. The base electrode of the first protective transistor T8 is connected to the emitter electrode of the transistor T6 via a lead 47 and a resistor R11 connected in said lead. The base electrode of the second protective transistor T9 is connected to the collector electrode of the transistor T7 via a lead 48 and a resistor R12 connected in said lead. The base electrode of the first protective transistor T8 and the base electrode of the second protective transistor T9 are connected to each other via a pair of diodes D4 and D5 connected in series circuit arrangement therebetween in a lead 49 which has a common electrical connection with the connection between the resistor R4 and the capacitor C3. The base electrodes of the first and second protective transistors T8 and T9 are also connected to each other via a pair of diodes D6 and D7 which are connected in series circuit arrangement therebetween in a lead 51.

The emitter electrode of the transistor T6 is connected to the collector electrode of the transistor T7 via a pair of resistors R13 and R14 connected in series circuit arrangement therebetween in a lead 52 which has an electrical connection in common with a point in the connection between the resistor R4 and the capacitor C3. The collector electrode of the transistor T5 is directly connected to the base electrode of the transistor T7 via a lead 53. The emitter electrode of the transistor T5 is connected to the collector electrode of the transistor T7 via a lead 54 and a resistor R15 connected in said lead. A plurality of resistors R16, R17 and R18 are connected in series circuit arrangement between the leads 37 and 35, that is, between the positive and negative polarity terminals B+ and B−. The resistor R17 is a variable resistor having a slidable contact or tap 55. A variable resistor R19 is connected between a common point in the connection between the resistor R4 and the capacitor C3 and the slidable tap 55 of the variable resistor R17. The variable resistor R19 has a slidable tap or contact 56 which is directly connected, via a lead 57, to a common point in the connection between the diodes D6 and D7. The loudspeaker 33 is connected between the capacitor C3 and the ground lead 35 via a lead 58.

The protective transistors T8 and T9 of the embodiment of FIG. 3 are similar, and function in a manner similar to the protective transistor T2 of the embodiment of FIG. 1. Current flowing through the output transistor T6 is detected as the terminal voltage of the resistor R13 and said voltage is applied to the base of the first protective transistor T8 via a resistor R11. Current flowing through the output transistor T7 is detected as the terminal voltage of the resistor R14 and said voltage is applied to the base of the second protective transistor T9 via the resistor R12. The collector voltages of the output transistors T6 and T7 are derived from a voltage divider which comprises the series-connected resistors R16, R17 and R18 and is applied via the slidable tap 56 of the resistor R19 and the diodes D6 and D7 to the bases of the first and second protective transistors T8 and T9, respectively.

If the variable resistors R19 and R17 are adjusted and set so that the voltages corresponding to the currents flowing through the output transistors may be canceled when an overcurrent flows through the output transistors, or when an overvoltage is applied to said output transistors, and the regulated voltages are produced at the bases of the protective transistors T8 and T9, said protective transistors are switched to their conductive conditions and switch the transistors T4 and T6, and T5 and T7, to their nonconductive conditions and thereby protect such transistors from damage or destruction. The diodes D2 and D3 function to prevent the flow of current in a reverse direction and to prevent a reverse bias and specifically prevent a reverse bias of the protective transistors T8 and T9. In an actual push-pull amplifier, however, the protective transistor which is connected to the transistor amplifier which is in its nonconductive condition may be in its conductive condition, so that it is not absolutely necessary that the diodes D4, D5, D6 and D7 be utilized.

Figure 4:
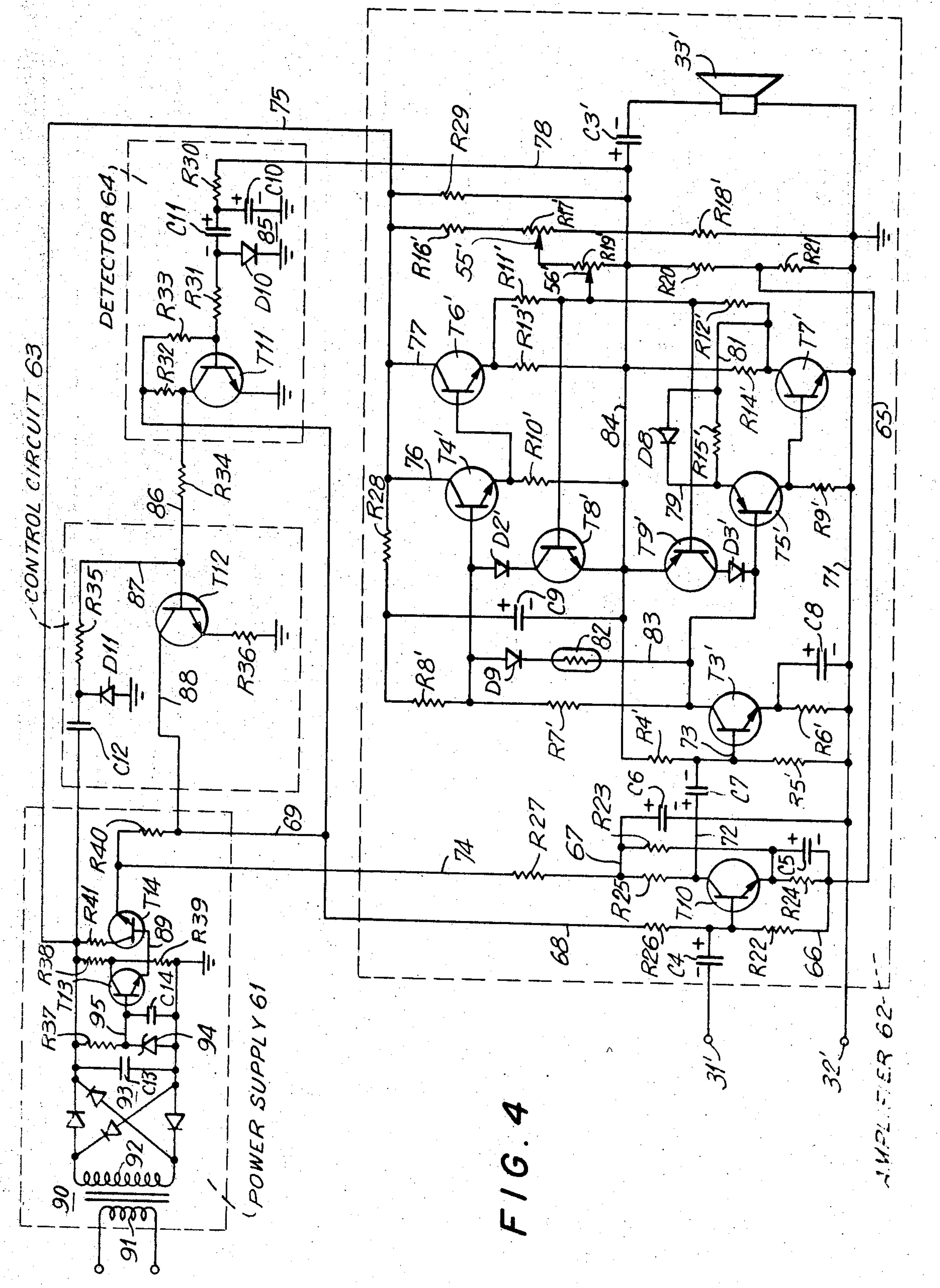
FIG. 4 is a circuit diagram of another embodiment of the overvoltage and overcurrent protective circuit of the present invention for a push-pull transistor amplifier having a negative feedback circuit.

In the embodiment of FIG. 4, a power supply 61 energizes an amplifier 62 via a control circuit 63 and a detector 64. The amplifier 62 is essentially the same in structure as the embodiment of FIG. 3. The principal difference between the amplifier 62 of the embodiment of FIG. 4 and the amplifier of FIG. 3 is that the amplifier 62 includes a negative feedback circuit. Thus, a transistor T10 is provided in a stage preceding the preamplifier or driving transistor T3′. Furthermore, a pair of resistors R20 and R21 are connected in the output of the amplifier and the negative feedback circuit comprises a lead 65 connected between a common point in the series connection of the resistors R20 and R21 and a common point in the connection of resistors R22 and R23.

The resistors R22 and R23 are connected in series circuit arrangement with each other, the resistor R22 being connected between the base electrode of the transistor T10 and the emitter electrode thereof via a lead 66 and a resistor R24. The resistor R23 is connected between the emitter electrode of the transistor T10 and the collector electrode thereof via a lead 67 and a resistor R25. The input terminal 31′ is connected to the base electrode of the transistor T10 via a capacitor C4 and is also connected to the detector 64 via a resistor R26 and a lead 68 and to the power supply 61 via said resistor, said lead and a lead 69.

The emitter electrode of the transistor T10 is connected to a common point in the series circuit connection of the resistor R23′ and a capacitor C5. The capacitor C5 is connected between a common point in the connection between the resistors R22 and R24 and the emitter electrode of the transistor T10. A capacitor C6 is connected between a common point in the connection between the resistors R23 and R25 and a lead 71 which extends from the other input terminal 32′ to a terminal of the loudspeaker 33′. The collector electrode of the transistor T10 is connected to the base electrode of the transistor T3′ via a lead 72, a lead 73 and a capacitor C7 connected in the lead 72. A common point in the connection of the resistors R23 and R25 is connected to the power supply 61 via a lead 74 and a resistor R27 connected in said lead. The collector electrode of the transistor T3' is connected to the power supply 61 via a lead 75 and the resistors R7', R8' and a resistor R28 connected in series in said lead. The collector electrodes of the transistors T4' and T6' are connected to the power supply 61 via the lead 75 and leads 76 and 77, respectively.

The detector 64 is connected to a common point in the connection between the resistor R4' and the capacitor C3' of the amplifier 62 via a lead 78. A resistor R29 is connected between the lead 75 and a common point in the connection between the resistor R4' and the capacitor C3'. The emitter electrode of the transistor T3' is connected to the ground lead 71 via a capacitor C8. A diode D8 is connected between the emitter electrode of the transistor T5' and the collector electrode of the transistor T7' via a lead 79 and a lead 81. A capacitor C9 is connected between a common point in the connection between the resistors R8' and R28 and a common point in the connection between the resistor R4' and the capacitor C3'.

The transistor T10 functions to provide suitable values for the gain and phase of the negative feedback circuit. The resistors R26, R22, R27, R25, R24 and R23 function to provide the operating bias for the transistor T10 and to provide a suitable input. The capacitors C4 and C7 are input coupling capacitors. The capacitors C5 and C8 are AC bypass capacitors. The capacitors C6 and C9 are decoupling capacitors. A diode D9 and a thermistor 82 are connected in series circuit arrangement between the base electrode of the transistor T4' and the collector electrode of the transistor T3' via a lead 83. The diode D9 functions with the thermistor 82 to lower the input impedance of the transistors T4' and T5' and to provide temperature compensation. The diode D8' and the resistor R15' have resistance values equal to the value of the impedance between the base and emitter electrodes of the transistor T6' and causes the impedance of the base electrode of the transistor T4' to be equal to the impedance of the base electrode of the transistor T5'. This insures that the circuitry above a lead 84, connecting the resistor R4' in series with the capacitor C3', is symmetrical with the circuit below said lead. The remaining transistors, resistors, capacitors and diodes in the amplifier 62 of the embodiment of FIG. 4 function in a manner similar to their corresponding components of the embodiment of FIG. 3.

If the protective transistors T8' and T9' are in their conductive condition and the transistors T4' and T6', and T5' and T7' are switched to their nonconductive conditions by the circuit operation, as described with reference to FIG. 3, the voltage of the lead 84 is decreased and the voltage of the point of connection of the negative feedback circuit 65 between the resistors R20 and R21 is decreased, so that there is no feedback. If, however, there is no need for the operation of the protective circuit, so that the transistors T4' and T6', and T5' and T7' are in their conductive condition, the input signals are supplied directly to the transistors T4' and T6', and T5' and T7' before the negative feedback voltage appears at the point of connection of the negative feedback circuit 65 and the connection between the resistors R20 and R21, so that there is a negative feedback. The negative feedback results in the supply of an excessively considerable input signal to the transistors T4' and T6', and T5' and T7', and the protective transistors T8' and T9' are switched to their conductive condition.

The voltage of the lead 84 is detected or determined by the detector 64 and the operation of the transistor T10 of the amplifier 62 is controlled by the control circuit 63. The transistor T10 is switched to its nonconductive condition when the protective transistors T8' and T9' are in their conductive condition due to the operation of the protective circuit, so that the transistor amplifiers T4' and T6', and T5' and T7' are switched to their nonconductive condition. When the transistor amplifiers are then switched to their conductive condition, the negative feedback is provided and the amplifier functions in its normal condition. In other words, when the transistor amplifiers T4' and T6', and T5' and T7' are in their nonconductive condition, the voltage of the lead 84 is decreased sharply and approaches ground potential. Consequently, negative pulses are supplied to the lead 84. The negative pulses are supplied to the detector 64 wherein they are supplied to the base electrode of a transistor T11 via an integration circuit 85.

The integration circuit 85 of the detector 64 comprises a resistor R30 and a resistor R31, and a capacitor C10 and a diode D10, as well as a capacitor C11. The negative pulses supplied to the detector transistor T11 switch said transistor to its nonconductive condition. The integration circuit 85 functions, via the resistor R30 and the capacitor C10, to cut the audio frequency or amplification frequency and the resistance value of said resistor and the capacitance of said capacitor are so selected that no voltage is applied to the base electrode of the transistor T11 at audio frequencies. The lead 68 from the amplifier 62 is connected to the collector electrode of the transistor T11 via a resistor R32 and is connected to the base electrode of said transistor via a resistor R33. The emitter electrode of the detector transistor T11 is connected to a point at ground potential.

In the amplifier 62, a positive pulse is produced when the protective transistors T8' and T9' are in their conductive condition. The voltage of the lead 84 is then decreased, and when the cause of protective operation is removed, said transistors are switched to their nonconductive condition. The positive pulse voltage charges the capacitor C11 of the detector 64 and prevents the erroneous switching of the transistor T11 to its conductive condition. The diode D10 expedites the discharge of the capacitor C11 and also expedites the charging of said capacitor by the positive pulse voltage. The resistor R31 protects the detector transistor T11 and, in conjunction with the resistor R33, provides a suitable base bias.

When the transistor T11 of the detector 64 is switched to its nonconductive condition, a positive voltage is applied to the collector electrode thereof. Such positive voltage at the collector is applied to the base electrode of a control transistor T12 of the control circuit 63 via a resistor R34 which is connected in a lead 86 between the collector electrode of the transistor T11 and the base electrode of the transistor T12. The positive base voltage of the control transistor T12 switches said transistor to its conductive condition, so that its collector voltage is decreased and becomes negative. The negative collector voltage of the control transistor T12 is applied to the base electrode of the transistor T10 of the amplifier 62 via the leads 69 and 68 and the resistor R26. Such negative voltage switches the transistor T10 to its nonconductive condition and blocks the input of the driving transistors T3' and the transistor amplifiers T4' and T6', and T5' and T7'.

The protective operation accomplished by the protective transistors T8' and T9' is completed within milliseconds and the transistors are restored to their normal operating conditions in 0.2—0.3 second. The transistor T10 of the amplifier 62 remains in its nonconductive condition for 1—2 seconds after the cessation of the protective operation and may prevent an excessively large input signal from being again supplied to the transistor amplifiers and enables the protective operation to be recommenced after it has ceased due to the removal of the cause for such protective operation.

In the control circuit 63, a lead 87 is connected from the base electrode of the control transistor T12 to the power supply 61 and includes a capacitor C12 in series circuit arrangement with a resistor R35. A common point in the connection between the capacitor C12 and the resistor R35 is connected to a point at ground potential via a diode D11. The emitter electrode of the transistor T12 is connected to a point at ground potential via a resistor R36. The collector electrode of the control transistor T12 is connected to the power supply 61 via a lead 88.

The power supply 61 comprises a transistor T13 having an emitter electrode connected to the base electrode of a transistor T14 via a lead 89. The connection of a the transistors T13 and T14 is known as a Darlington connection.

A transformer 90 comprises a primary winding 91 and a secondary winding 92. A full wave rectifier 93, which comprises four diodes, is connected across the secondary winding 92 of the transformer 90. A smoothing capacitor C13 is connected across the output of the full wave rectifier 93. A voltage regulator is connected across the capacitor C13. The voltage regulator comprises the transistors T13 and T14. The voltage regulator also comprises a Zener diode 94 connected in series circuit arrangement with a resistor R37 across the smoothing capacitor C13. A common point in the connection between the Zener diode 94 and the resistor R37 is connected to the base electrode of the transistor T13 via a lead 95. A capacitor C14 is connected between the base electrode of the transistor T13 and the lead 74 to the amplifier 62. The collector electrode of the transistor T13 is connected to the lead 87 to the control circuit 63 via a resistor R38 and to the lead 74 to the amplifier 62 via a resistor R39. The emitter electrode of the transistor T14 is connected to the lead 69 via a resistor R40. The collector electrode of the transistor T14 is connected to each of the leads 87 and 75 via a resistor R41.

When a source of power (not shown in the FIGS.) is connected to the power supply 61, a positive voltage is immediately applied to the collector electrode of the transistor T6′ of the amplifier 62. A voltage, however, does not immediately appear at the lead 84, so that, consequently, the transistor T6′ is overloaded and protective operation of the circuit is instituted. After the elapse of a period of time, a voltage appears at the lead 84 and protective operation of the circuit ceases. However, the input signal is supplied to the amplifier 62 and there is no negative feedback, since the transistors T4′ and T6′, and T5′ and T7′ are in their nonconductive condition. Thus, protective operation of the circuit is instituted. For this reason, and in accordance with the present invention, a positive pulse of the power supply 61 is derived from the positive polarity terminal of the full wave rectifier 93 at the time that the source of power is connected to said power supply. The positive pulse is supplied to the base of the transistor T12 of the control circuit 63 via the capacitor C12, the diode D11 and the resistor R35, which together constitute a time constant circuit. The control transistor T12 is thus switched to its conductive condition and a negative voltage is applied to the collector electrode and causes the transistor T10 of the amplifier 62 to be switched to its nonconductive condition. The time constant of the time constant circuit C12, D11, R34 is so selected, that it prevents the push-pull amplifier from being switched to its inoperative condition when the source of power is connected to the power supply 61 immediately after said amplifier is switched to its nonconductive condition while a voltage is applied to said amplifier.

The protective operation of the circuit of the present invention is such that even if an input is supplied to the transistor amplifier which provides a particularly considerable output signal, the transistor amplifier is not damaged or destroyed by considerable noise produced at the time of supply of the input. Furthermore, there is no production of noise during the supply of the input by the loudspeaker nor is there an adverse effect due to the supply of input pulses of abnormally large amplitude. The embodiment of FIG. 4 also prevents the reinstitution of protective operation by a high input signal after the protective operation has ceased, in an amplifier having a negative feedback. The embodiment of FIG. 4 also prevents reinstitution of protective operation, after the protective operation has ceased, due to the connection of the source of power to the power supply 61. The protective circuit of the present invention thus provides complete protection for the transistors of an audio amplifier.

While the invention has been described by means of specific examples and in specific embodiments, we do not wish to be limited thereto, for various modifications will occur to those skilled in the art without departing from the spirit and scope of the invention.

We claim:

1. An overvoltage and overcurrent protective circuit for a transistor amplifier having an input and an output, comprising:

deriving means for deriving a first voltage proportionate to current flowing through said transistor amplifier and a second voltage proportionate to the voltage applied to said transistor amplifier;

a protective transistor connected to the input of said transistor amplifier and having an input and an output;

coupling means for applying said first and second voltages to the input of said protective transistor in a manner whereby when the difference between said voltages reaches a predetermined magnitude said magnitude switches said protective transistor to its conductive condition to switch said transistor amplifier to its nonconductive condition; and a diode connected in the output of said transistor amplifier for impeding an increase in voltage applied to said transistor amplifier upon a decrease in current flowing through said transistor amplifier in Class A operation.

2. An overvoltage and overcurrent protective circuit for a transistor amplifier having an input and an output including emitter, collector and base electrodes, comprising:

deriving means for deriving a first voltage proportionate to current flowing through said transistor amplifier and a second voltage proportionate to the voltage applied to said transistor amplifier;

a protective transistor connected to the input of said transistor amplifier and having an input and an output including emitter, collector and base electrodes;

coupling means for applying said first and second voltages to the input of said protective transistor in a manner whereby the difference between said voltages reaches a predetermined magnitude said magnitude switches said protective transistor to its conductive condition to switch said transistor amplifier to its nonconductive condition;

a load;

a source of supply voltage having one terminal connected to the emitter electrode of said protective transistor and another terminal of opposite polarity connected to the collector electrode of said transistor amplifier through said load; and means directly connecting the collector electrode of said protective transistor to the base electrode of said transistor amplifier.

3. An overvoltage and overcurrent protective circuit for a single ended push-pull transistor amplifier having a negative feedback circuit and an input and an output comprising:

deriving means for deriving a first voltage proportionate to current flowing through said transistor amplifier and a second voltage proportionate to the voltage applied to said transistor amplifier;

protective transistors connected to the input of said transistor amplifier and having an input and an output;

a transistor coupled to the inputs of said protective transistors for providing suitable values for the gain and phase of the negative feedback circuit of said single ended push-pull transistor amplifier; and coupling means for applying said first and second voltages to the input of said protective transistor in a manner whereby when the difference between said voltages reaches a predetermined magnitude said magnitude switches said protective transistors to their conductive condition to switch said transistor amplifier to its nonconductive condition, said coupling means including detector means for detecting the voltage difference magnitude and control circuit means coupling said detector means to said transistor for controlling the operation of said transistor.

4. An overvoltage and overcurrent protective circuit as claimed in claim 3, further comprising a power supply coupled to said push-pull amplifier and a source of power connectable to said power supply and wherein said control circuit means includes a time constant circuit having a time constant which prevents the push-pull transistor amplifier from being switched to its nonconductive condition when said source of power is connected to said power supply immediately after said push-pull amplifier is switched to its nonconductive condition while a voltage is applied to said push-pull amplifier.

5. An overvoltage and overcurrent protective circuit as claimed in claim 4, wherein said time constant circuit comprises a capacitor and a resistor connected in series circuit arrangement and a diode connected between a common point in the connection between said capacitor and said resistor and a point at ground potential.

6. An overvoltage and overcurrent protective circuit as claimed in claim 1, further comprising a first resistor connected between the emitter electrode of said transistor amplifier and said one terminal of said source of supply voltage, a capacitor and a variable resistor connected in series circuit arrangement between the collector electrode of said transistor amplifier and said one terminal of said source of supply voltage, said variable resistor having a slidable tap.

7. An overvoltage and overcurrent protective circuit as claimed in claim 6, further comprising a second resistor and a diode connected in series circuit arrangement between the emitter electrode of said transistor amplifier and the slidable tap of said variable resistor and means connecting the base electrode of said protective transistor to a common point in the connection between said second resistor and said diode.